US010354306B2

(12) United States Patent
Gupta et al.

(10) Patent No.: US 10,354,306 B2
(45) Date of Patent: *Jul. 16, 2019

(54) ACCOUNT RECOMMENDATIONS

(71) Applicant: Microsoft Technology Licensing, LLC, Redmond, WA (US)

(72) Inventors: Abhishek Gupta, San Francisco, CA (US); Anmol Bhasin, Los Altos, CA (US); Sachin Rekhi, Mountain View, CA (US); Annabel Fang Liu, Los Altos, CA (US); Angela Yoonjeong Yang, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/036,736

(22) Filed: Jul. 16, 2018

(65) Prior Publication Data
US 2018/0322553 A1 Nov. 8, 2018

Related U.S. Application Data

(63) Continuation of application No. 14/572,302, filed on Dec. 16, 2014, now Pat. No. 10,074,122.
(Continued)

(51) Int. Cl.
*G06Q 30/00* (2012.01)
*G06Q 30/06* (2012.01)
(52) U.S. Cl.
CPC ............... *G06Q 30/0617* (2013.01)
(58) Field of Classification Search
CPC ............................... G06Q 30/06–08
(Continued)

(56) References Cited

U.S. PATENT DOCUMENTS 10,074,122 B2 * 9/2018 Gupta ............... G06Q 30/0617
2011/0196716 A1 8/2011 Srinivasan et al.
(Continued)

FOREIGN PATENT DOCUMENTS

CN 101506833 A 8/2009
CN 102754110 A 10/2012
(Continued)

OTHER PUBLICATIONS

True Advantage Inc.'s Technology-Enabled Lead Generation for Financial Services Now Available on Salesforce.com's AppExchange (PR Newswire Oct. 9, 2006) https://dialog.proquest.com/professional/docview/670857299?accountid=142257 (Year: 2006).*
(Continued)

*Primary Examiner* — Ethan D Civan
(74) *Attorney, Agent, or Firm* — Schwegman Lundberg & Woessner, P.A.

(57) ABSTRACT

A method and system for providing account recommendations is disclosed. A server system stores sales data for a first member, wherein sales data includes profile information for one or more individual customers. The server system analyzes the profile information for one or more of the individual customers to identify one attributes associated with the customers. The server system determines one or more additional members with member profiles that include the one or more identified attributes. For a respective additional member in the at least one of the determined additional members the server system determines, based on stored information about the respective additional member, an respective organization associated with the at least one determined additional member; and selects the respective organization as an account recommendation.

20 Claims, 6 Drawing Sheets

Related U.S. Application Data

(60) Provisional application No. 62/019,384, filed on Jun. 30, 2014.

(58) Field of Classification Search
USPC .............................................. 705/26.1–27.2
See application file for complete search history.

(56) References Cited

U.S. PATENT DOCUMENTS

| | | |
|---|---|---|
| 2011/0246255 A1 | 10/2011 | Gilbert et al. |
| 2012/0046992 A1 | 2/2012 | Hu et al. |
| 2015/0379603 A1 | 12/2015 | Gupta et al. |

FOREIGN PATENT DOCUMENTS

| | | |
|---|---|---|
| CN | 105205089 A | 12/2015 |
| WO | WO-2016003506 A1 | 1/2016 |

OTHER PUBLICATIONS

"U.S. Appl. No. 14/572,302, Examiner Interview Summary dated Jan. 22, 2018", 3 pgs.
"U.S. Appl. No. 14/572,302, Examiner Interview Summary dated Sep. 13, 2017", 3 pgs.
"U.S. Appl. No. 14/572,302, Final Office Action dated Dec. 27, 2017", 11 pgs.
"U.S. Appl. No. 14/572,302, Non Final Office Action dated Feb. 26, 2018", 9 pgs.
"U.S. Appl. No. 14/572,302, Non Final Office Action dated Jul. 13, 2017", 13 pgs.
"U.S. Appl. No. 14/572,302, Notice of Allowance dated May 10, 2018", 7 pgs.
"U.S. Appl. No. 14/572,302, Response filed Jan. 30, 2018 to Final Office Action dated Dec. 27, 2017", 9 pgs.
"U.S. Appl. No. 14/572,302, Response filed Mar. 29, 2018 to Non Final Office Action dated Feb. 26, 2018", 8 pgs.
"U.S. Appl. No. 14/572,302, Response filed Oct. 11, 2017 to Non Final Office Action dated Jul. 13, 2017", 8 pgs.
"Chinese Application Serial No. 201510199214.0, Office Action dated Feb. 5, 2018", w/ English Translation, 22 pgs.
"International Application Serial No. PCT/US2015/022968, International Preliminary Report on Patentability dated Jan. 12, 2017", 6 pgs.
"International Application Serial No. PCT/US2015/022968, International Search Report dated Jul. 9, 2015", 2 pgs.
"International Application Serial No. PCT/US2015/022968, Written Opinion dated Jul. 9, 2015", 4 pgs.
"True Advantage Inc.'s Technology-Enabled Lead Generation for Financial Services Now Available on Salesforce.com's AppExchange", [Online] Retrieved from the Internet : <https://dialog.proquest.com/professional/docview/670857299?accountid=142257>, (Oct. 9, 2006).

\* cited by examiner http://www.thesecondsocialnetwork.com/

WELCOME, John Smith

Overview | Profile | Customer Data | Lead Recommendations | Account Recommendations

ACCOUNT RECOMMENDATIONS

Pear, Inc
Consumer
Electronic Devices
Alexandria, VA
402-1

SBM
Technology
Solutions
Raleigh, NC
402-2

Pear, Inc
Consumer
Electronic Devices
Alexandria, VA
402-3

Widgets, Inc
Industrial
Compoennts
Charlotte, NC
402-4

RackScript
Hosting Services
Arlignton, VA
402-5

Device Fruit
Electronic Devices
Raleigh, NC
402-6

See More Recommendations

PEOPLE YOU MAY KNOW

Sarah Dargatz
CEO, Gadgets, Inc

Derrick Tedrick
Regional Manager
Widgets, Inc.

Seth Whitmer
Software Engineer
SBM

MEMBER PROFILE VIEWS

14 — Your profile has been viewed by 14 people in the last 7 days

37 — You have appeared in search results 37 times in the last 3 days

Your Network

289 — Your 289 connections link you to 4,000,000+ members.

ACCOUNT RECOMMENDATIONS

RELATED APPLICATIONS

This application is a continuation of prior application Ser. No. 14/572,302, filed Dec. 16, 2014, and claims the benefit of priority to U.S. Provisional Patent Application Ser. No. 62/019,384, filed Jun. 30, 2014, which applications are incorporated herein by reference in their entirety.

TECHNICAL FIELD

The disclosed embodiments relate generally to the field of social networks and, in particular, to a system for generating recommendations to sales professionals.

BACKGROUND

The rise of the computer age has resulted in increased access to personalized services online. As the cost of electronics and networking services drop, many services that were previously provided in person are now provided remotely over the Internet. For example, entertainment has increasingly shifted to the online space with companies such as Netflix and Amazon streaming TV shows and movies to members at home. Similarly, electronic mail (e-mail) has reduced the need for letters to physically be delivered. Instead, messages are sent over networked systems almost instantly. Online social networking sites allow members to build and maintain personal and business relationships in a much more comprehensive and manageable manner.

One important application of new computer technologies is the sales world. Sales professionals (e.g., people or companies that derive their income from selling goods or products to other individuals or companies) rely on sales leads (e.g., names and contact information of individuals or companies that will potentially want to purchase the product or service offered by the sales professionals) to make contacts that lead to sales. Networked computer systems can collect and process large amounts of data to streamline and enhance the system for generating sales leads. Thus, networked computer systems that store large amounts of data about companies and their employees can offer enhanced search capabilities to their members such that a member can specify search criteria and then receive search results that list one or more search results that match the specified criteria (e.g., recommendations for people who match the search query).

DESCRIPTION OF THE DRAWINGS

Some embodiments are illustrated by way of example and not limitation in the figures of the accompanying drawings, in which:

FIG. 4 is a member interface diagram illustrating an example of a member interface, according to some embodiments.

Like reference numerals refer to corresponding parts throughout the drawings.

DETAILED DESCRIPTION

Figure 1:
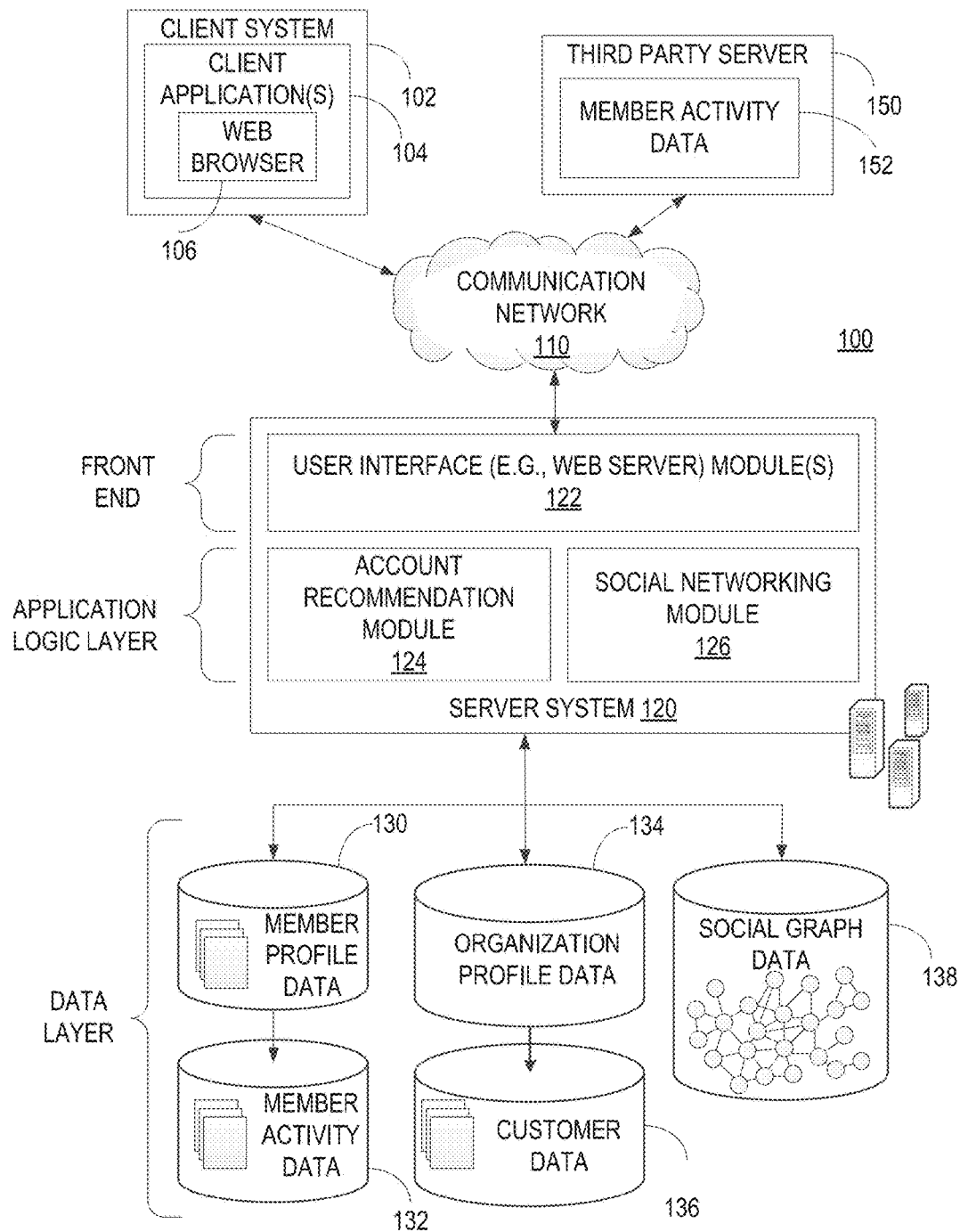
FIG. 1 is a network diagram depicting a client-server system that includes various functional components of a social network server system in accordance with some embodiments.

The present disclosure describes methods, systems and computer program products for using existing member profile and activity data to identify appropriate accounts to recommend to members of a network. In the following description, for purposes of explanation, numerous specific details are set forth to provide a thorough understanding of the various aspects of different embodiments. It will be evident, however, to one skilled in the art, that the any particular embodiment may be practiced without all of the specific details and/or with variations permutations and combinations of the various features and elements described herein.

Larger networked systems with access to a large amount of member data can improve the quality of account recommendations. In addition, the large networked system can generate account recommendations without receiving specific search criteria (or a search query). For example, the large networked system receives a request for a webpage associated with a particular member of the networking system (e.g., sales person visits their own home page on the system) without a specific search query and the large networked system generates and returns one or more account recommendations for organizations for which it stores profile data. The recommendations are generated by the networked system based on the organizational information that is stored about the organizations, their employees, and the requesting member.

The server system analyzes the organization profile of at least some of the organizations with profiles that are stored on the server system to determine whether the organization would be an appropriate account recommendation for a first member of the server system. Examples of information that is important in determining whether a particular company is likely to have product purchasing potential include, but are not limited to, the location of the organization, the industry of the organization, the employees of the organization, and so on.

In some example embodiments, the server system uses previous sales data of the first member to generate relevant account recommendations for the first member. Thus, generating relevant account recommendations for a first member of the server system includes analyzing the first member's previous sales data to identify one or more members that are or have been customers of the first member (e.g., have some decision making authority in the decision to purchase goods or services from the first member).

The server system then analyzes the member profiles of the identified customers to determine one or more attributes associated with the customers. Once the server system has identified the one or more attributes, the server system can then search through the stored profiles of other members of the server system to identify similar members whose profiles include similar attributes to those found in the identified customer's member profiles.

The server system then identifies the organizations that employ the identified similar members. In this way, the server system identifies companies and organizations that include employees (members of the server system) who are similar to past and current customers of the first member. Based on this information, the server system generates account recommendations for the first member for the identified companies and organizations.

In some example embodiments, the server system also uses other data to identify potential target organizations such as the size of the organization, its industry sector, its location, its revenue and profits, the organization's popularity (e.g., measured by profile views, likes, social media mentions, and so on), and any other relevant factors.

In some example embodiments, the server system imports company data from third party server systems (e.g., CRMs that are distinct from the server system). Importing data involves accessing the third party server system via available tools (e.g., APIs) to download and store the company information on the networking system.

In some example embodiments, the server system generates a list of potential account recommendations and then ranks them based on a confidence level that the account recommendations will be useful to the first member. One way to rank a list of potential account recommendation is to generate a match score between each potential account recommendation and the first member. This match score can be based on a list of preferences of the first member. The list of preferences sets out one or more user preferred attributes for the account recommendations. Some attributes may be mandatory (e.g., a sales professional whose selling area is strictly defined may require that all account recommendations be for companies located in a particular geographical area). Other attribute preferences may reflect preferences of the member, either explicitly received from the member (e.g., they prefer members with certain titles) or implicitly derived from the member's past sales information (e.g., ninety percent of the member's successful sales have been to members that went to the same university as the first member).

Once the one or more potential account recommendations have been ranked, the server system selects one or more of the potential account recommendations to deliver to the first member. For example, the server system determines the number of account recommendations that will fit on the displayed webpage and sends the determined number of sales lead recommendations.

FIG. 1 is a network diagram depicting a client-server system 100 that includes various functional components of a server system 120, in accordance with some embodiments. The client-server system 100 includes one or more client systems 102, a server system 120, and one or more other third party servers 150. One or more communication networks 110 interconnect these components. The communication network 110 may be any of a variety of network types, including local area networks (LANs), wide area networks (WANs), wireless networks, wired networks, the Internet, personal area networks (PANs), or a combination of such networks.

In some embodiments, a client system 102 is an electronic device, such as a personal computer (PC), a laptop, a smartphone, a tablet, a mobile phone or any other electronic device capable of communication with a communication network 110. The client system 102 includes one or more client applications 104, which are executed by the client system 102. In some embodiments, the client application(s) 104 include one or more applications from the set consisting of search applications, communication applications, productivity applications, game applications, word processing applications, or any other useful applications. The client application(s) 104 include a web browser 106. The client system 102 uses the web browser 106 to communicate with the server system 120 and displays information received from the server system 120. In some embodiments, the client system 102 includes an application specifically customized for communication with the server system (FIG. 1, 120) (e.g., a LinkedIn iPhone application).

In some embodiments, the client system 102 sends a request to the server system 120 for a webpage associated with the server system (e.g., the client system 102 sends a request to the server system 120 for an updated account activity webpage). For example, a member of the client system 102 logs onto the server system 120 and clicks to view updates to their personalized account page. In response, the client system 102 receives the updated account page (e.g., news items, recommendations, status updates) and displays it on the client system 102.

In some embodiments, as shown in FIG. 1, the server system 120 is generally based on a three-tiered architecture, consisting of a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid unnecessary detail, various functional modules and engines that are not germane to conveying an understanding of the various embodiments have been omitted from FIG. 1. However, a skilled artisan will readily recognize that various additional functional modules and engines may be used with a server system 120, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the various embodiments are by no means limited to this architecture.

As shown in FIG. 1, the front end consists of a user interface module (e.g., a web server) 122, which receives requests from various client systems 102, and communicates appropriate responses to the requesting client systems 102. For example, the user interface module(s) 122 may receive requests in the form of Hypertext Transport Protocol (HTTP) requests, or other web-based, API requests. The client system 102 may be executing conventional web browser applications, or applications that have been developed for a specific platform to include any of a wide variety of mobile devices and operating systems.

As shown in FIG. 1, the data layer includes several databases, including databases for storing data for various entities of the social graph, including member profile data 130, member activity data 132 (e.g., data describing member interactions with the social network server system 120 or with other members throughout the social network server system 120), organization profile data 134, customer data 136 (e.g., data that describes business relationships between members of the server system such as seller and customer relationships), and a social graph database 138, which is a particular type of database that uses graph structures with nodes, edges, and properties to represent and store data. Of course, with various alternative embodiments, any number of other entities might be included in the social graph (e.g., companies, organizations, schools and universities, religious groups, non-profit organizations, and any other group), and as such, various other databases may be used to store data corresponding with other entities. It should be noted that the components of the data layer may be referred to either "data" or "databases" in this application (e.g., member profile data 130 or member profile database 130) and these terms are used interchangeably.

Consistent with some embodiments, when a person initially registers to become a member of the server system 120, the person will be prompted to provide some personal information, such as his or her name, age (e.g., birth date), gender, interests, contact information, home town, address, educational background (e.g., schools, majors, etc.), current job title, job description, industry, employment history, skills, professional organizations, memberships with third party servers 150, and so on. This information is stored, for example, in the member profile database 130.

In some embodiments, the member profile database 130 includes member activity data 132. In other embodiments, the member activity database 132 is distinct from, but associated with, the member profile database 130. The member activity database 132 stores activity data for each member of the server system 120. Member activity data includes, but is not limited to, the dates and times the member logs onto or off of the system, information viewed by the member on the server system 120 (e.g., pages associated with people, organizations, brands, and or companies, jobs listings), communications made with other members (posts or messages), saved account and lead recommendations, and posts made by the member.

The member organization database 134 also stores data related to organizations on the server system 120 and their members. Thus, members of the server system 120 may be associated with employers, customers, and other organizations such as schools, professional groups and non-profit organizations (e.g., based on interests, family connections, schools, employers, etc.)

Once registered, a member may invite other members, or be invited by other members, to connect via the network service. A "connection" may include a bi-lateral agreement by the members, such that both members acknowledge the establishment of the connection. Similarly, with some embodiments, a member may elect to "follow" another member. In contrast to establishing a "connection," the concept of "following" another member typically is a unilateral operation and, at least with some embodiments, does not include acknowledgement or approval by the member that is being followed. When one member follows another, the member who is following may receive automatic notifications about various activities undertaken by the member being followed. In addition to following another member, a member may elect to follow a company, a topic, a conversation, or some other entity, which may or may not be included in the social graph. Various other types of relationships may exist between different entities and are represented in the social graph data 138.

In some example embodiments, the member organization database 134 also includes organizational activity data. Organizational activity includes information that details changes within a plurality of organizations, including but not limited to, changes in the staff of the organization, changes in an organization's location, changes in an organization's business, and any other information related to an organization.

In some example embodiments, the customer data 136 includes sales relationships for one or more members. For example, customer data 136 includes a list of customers, target companies, previous sales, sales preferences, job descriptions, and any other data relevant to a sales professional.

In some example embodiments, the server system 120 is also associated with or provides a social networking service. The social networking service may provide a broad range of other applications and services that allow members the opportunity to share and receive information, often customized to the interests of the member. For example, with some embodiments, the social networking service may include a photo sharing application that allows members to upload and share photos with other members. As such, at least with some embodiments, a photograph may be a property or entity included within a social graph. With some embodiments, members of a social networking service may be able to self-organize into groups, or interest groups, organized around a subject matter or topic of interest. In some embodiments, the data for a group may be stored in a database. When a member joins a group, his or her membership in the group will be reflected in the customer data 136, the member activity data 132, and the social graph database 138

With some embodiments, members can be affiliated with a particular organization in an employee/employer relationship or an owner relationship. The server system (e.g., system 120 in FIG. 1) will store this information in the member profile data 130, the organizational profile data 134, and, potentially, in the customer data 136. For example, member A lists Company C as an employer. This is stored in the member profile associated with member A and in the organization profile of Company C. If members of the server system (e.g., system 120 in FIG. 1) indicate an affiliation with a company at which they are employed, news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph database 138.

In some embodiments, the application logic layer includes various application server modules, which, in conjunction with the user interface module(s) 122, generates various user interfaces (e.g., web pages) with data retrieved from various data sources in the data layer. With some embodiments, individual application server modules are used to implement the functionality associated with various applications, services, and features of the social network service. For instance, a messaging application, such as an email application, an instant messaging application, or some hybrid or variation of the two, may be implemented with one or more application server modules. Similarly, a search engine enabling members to search for and browse member profiles may be implemented with one or more application server modules. Of course, other applications or services that utilize the account recommendation module 124 may be separately implemented in their own application server modules.

In addition to the various application server modules, the application logic layer includes an account recommendation module 124. As illustrated in FIG. 1, with some embodiments, the account recommendation module 124 is implemented as a service that operates in conjunction with various application server modules. For instance, any number of individual application server modules can invoke the functionality of the account recommendation module 124 to provide account recommendation services. However, with various alternative embodiments, the account recommendation module 124 may be implemented as its own application server module such that it operates as a stand-alone application. With some embodiments, the account recommendation module 124 includes or has an associated publicly available API that enables third-party applications to invoke the functionality of the account recommendation module 124.

Generally, the account recommendation module 124 assists members of the server system 120 that are sales professionals to identify new potential account targets (e.g., companies or organizations) based on the information stored at the server system 120 or received from the third party server 150 (e.g., a CRM). In some example embodiments, the sales professionals have submitted account preferences to the server system 120.

The server system 120 then analyzes the data stored at the server system 120 to identify one or more potential target accounts based on the stored member data. The server system 120 uses information associated with a plurality of companies or organizations to identify potential target accounts for a respective member. Some factors that the server system 120 uses to identify potential target accounts include the size of a company, its industry sector, its location, its revenue and profits, the company's popularity (e.g., measured by profile views, likes, social media mentions, and so on), and any other relevant factors.

The server system 120 also identifies potential target accounts based on the activities that the first member has already performed on the server system 120. For example, the server system 120 detects when a member has an interaction with another member of the server system 120, such as sending them an email, saving their contact information, viewing their profile, selling a product or service, or importing their data from a third party server system. The server system 120 then analyzes the stored interaction data to determine current customers or leads of interest to the first member. For example, if the first member has viewed member Y's profile and then saved that profile as an interesting or important lead, the server system 120 is able to determine that the first member has interest in member Y. The server system 120 can then search through the profiles of other members to identify members who are similar to member Y.

Once the server system 120 identifies members who are similar to current customers or leads of interest to the first member, the server system 120 then identifies the employers of those similar members. The server system can the select these employers as potential account recommendations for the first member. In this way, the server system 120 is able to identify companies and organizations not just by the statistics of the company, but also by the individual traits of the employees and managers of the company. This allows sales professionals to target organizations that are a better match for them.

The server system 120 then ranks the one or more potential account recommendations. Each identified potential account recommendation is given a match score based on one or more factors. In some example embodiments, the member preferences of the first member are used to generate a match for each potential member.

Once one or more potential target account recommendations have been ranked, the server system 120 selects one or more of the potential account recommendations to recommend to the first member. The number of account recommendations selected by the social network server system 120 is based on the amount of space available to display sales lead recommendations. For example, the first member requests a web page that is not associated with account recommendations. The server system 120 determines that a portion of the web page is available for displaying account recommendations (e.g., an open section beside or below the requested content) and selects one or two account recommendations with the highest match score. In another example, the first member requests a web page of account recommendations. In this case, the web page has a much larger dedicated area in which to display account recommendations and thus selects a larger number of account recommendations to display.

The selected one or more account recommendations are transmitted to the client system 102 for display to the requesting first member.

One or more third-party servers 150 connect to the social networking system (e.g., system 120 in FIG. 1) through a communication network 110. A third party server may also include member activity data 152 (e.g., the activity of members of the social networking system (e.g., system 120 in FIG. 1) when they interact through a third party server 150.

Figure 2:
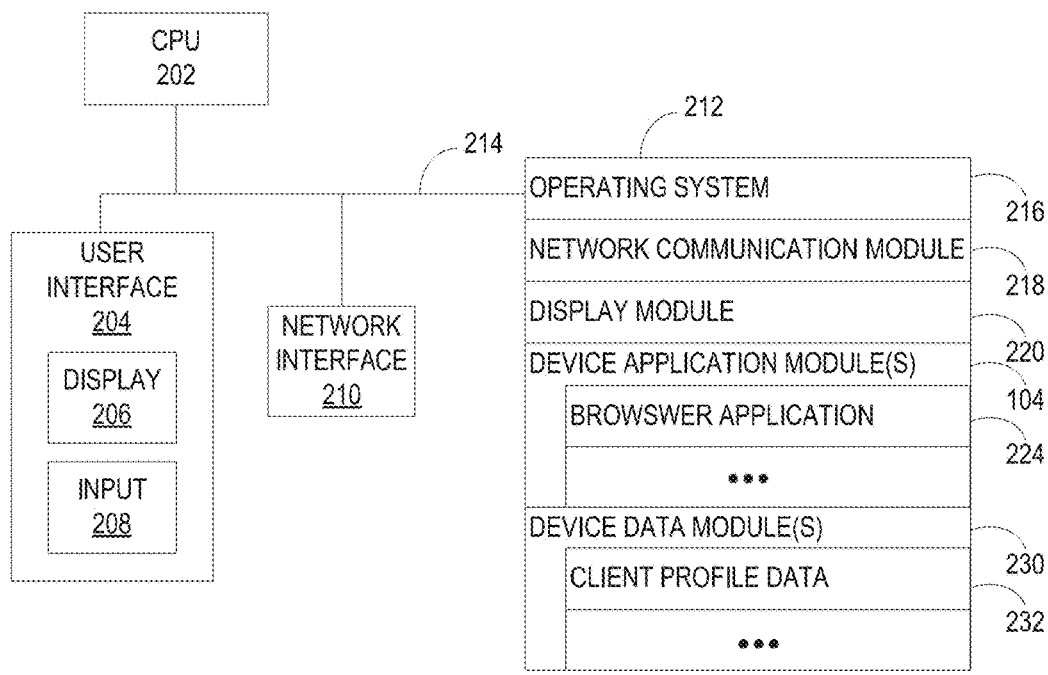
FIG. 2 is a block diagram illustrating a client system, in accordance with some embodiments.

FIG. 2 is a block diagram illustrating a client system 102, in accordance with some embodiments. The client system 102 typically includes one or more central processing units (CPUs) 202, one or more network interfaces 210, memory 212, and one or more communication buses 214 for interconnecting these components. The client system 102 includes a user interface 204. The user interface 204 includes a display device 206 and optionally includes an input means such as a keyboard, mouse, a touch sensitive display, or other input buttons 208. Furthermore, some client systems 102 use a microphone and voice recognition to supplement or replace the keyboard.

Memory 212 includes high-speed random access memory, such as dynamic random-access memory (DRAM), static random access memory (SRAM), double data rate random access memory (DDR RAM) or other random access solid state memory devices; and may include non-volatile memory, such as one or more magnetic disk storage devices, optical disk storage devices, flash memory devices, or other non-volatile solid state storage devices. Memory 212 may optionally include one or more storage devices remotely located from the CPU(s) 202. Memory 212, or alternately, the non-volatile memory device(s) within memory 212, comprise(s) a non-transitory computer readable storage medium.

In some embodiments, memory 212 or the computer readable storage medium of memory 212 stores the following programs, modules and data structures, or a subset thereof:

- an operating system 216 that includes procedures for handling various basic system services and for performing hardware dependent tasks;
- a network communication module 218 that is used for connecting the client system 102 to other computers via the one or more communication network interfaces 210 (wired or wireless) and one or more communication networks, such as the Internet, other WANs, LANs, metropolitan area networks (MANs), etc.;
- a display module 220 for enabling the information generated by the operating system 216 and client applications 104 to be presented visually on the display device 206;
- one or more client applications 104 for handling various aspects of interacting with the server system (FIG. 1, 120), including but not limited to:

a browser application 224 for requesting information from the social networking server system 120 (e.g., product pages and member information) and receiving responses from the server system 120; and a client data module 230, for storing data relevant to the clients, including but not limited to:

client profile data 234 for storing profile data related to a member of the server system 120 associated with the client system 102.

Figure 3:
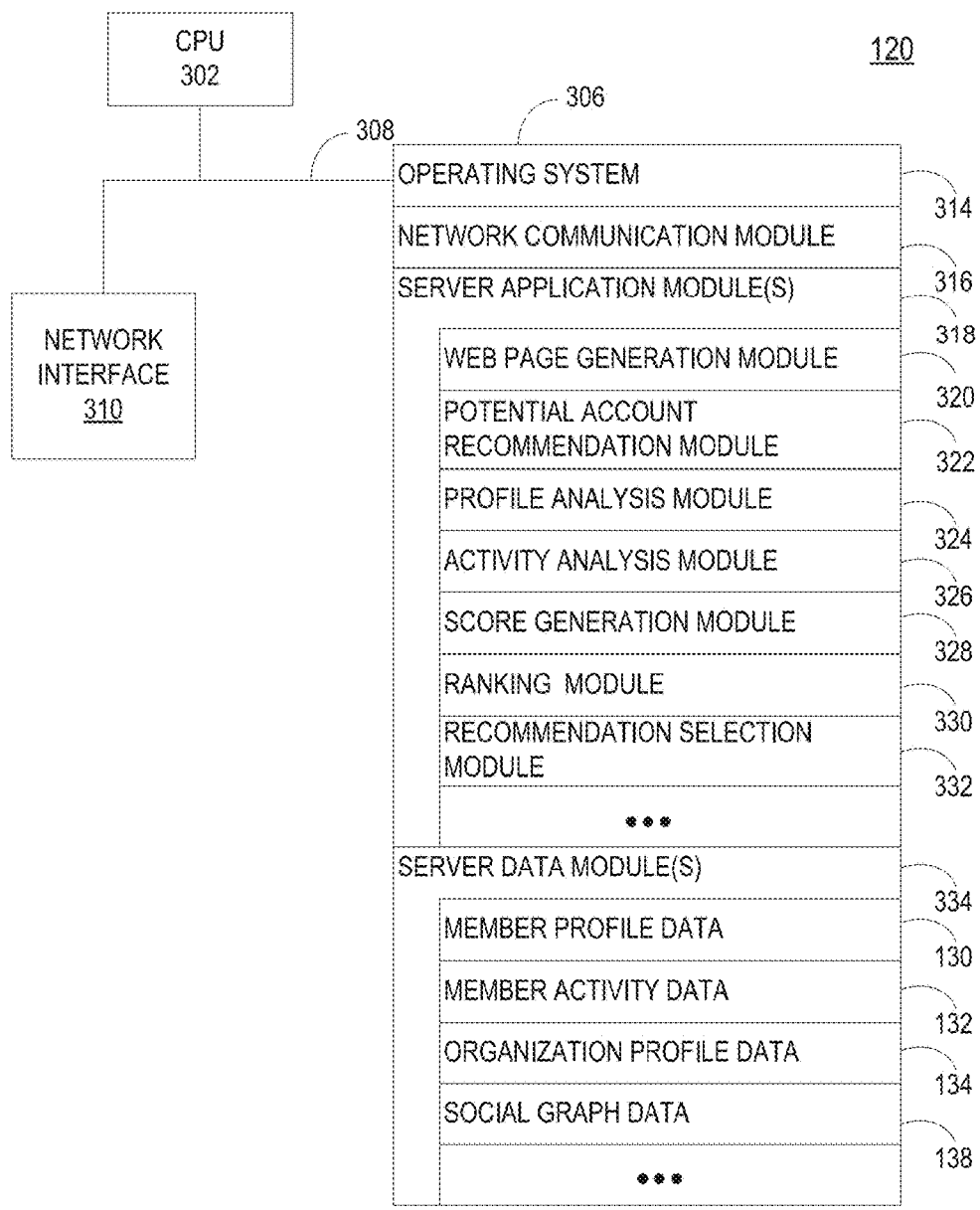
FIG. 3 is a block diagram illustrating a social network server system, in accordance with some embodiments.

FIG. 3 is a block diagram illustrating a server system 120, in accordance with some embodiments. The server system 120 typically includes one or more CPUs 302, one or more network interfaces 310, memory 306, and one or more communication buses 308 for interconnecting these components. Memory 306 includes high-speed random access memory, such as DRAM, SRAM, DDR RAM or other random access solid state memory devices; and may include non-volatile memory, such as one or more magnetic disk storage devices, optical disk storage devices, flash memory devices, or other non-volatile solid state storage devices. Memory 306 may optionally include one or more storage devices remotely located from the CPU(s) 302.

Memory 306, or alternately the non-volatile memory device(s) within memory 306, comprises a non-transitory computer readable storage medium. In some embodiments, memory 306 or the computer readable storage medium of memory 306 stores the following programs, modules and data structures, or a subset thereof:

an operating system 314 that includes procedures for handling various basic system services and for performing hardware dependent tasks;

a network communication module 316 that is used for connecting the social networking server system 120 to other computers via the one or more communication network interfaces 310 (wired or wireless) and one or more communication networks, such as the Internet, other WANs, LANs, MANs, and so on;

one or more server application modules 318 for performing the services offered by social networking system 120, including but not limited to:

a web page generation module 320 for receiving requests from members of the server system 120 and, in response, generating web pages responsive to those requests, including, but not limited to, requests to view the member profile, requests to see an activity wall, requests to see social graph data, requests to see account recommendations, and so on;

a potential account recommendation module 322 for analyzing a group of companies and/or organizations stored on the server system 120 to determine potential target companies to send as account recommendations to a requesting member;

an organization profile analysis module 324 for analyzing an organization's profile to determine whether the organization is a good match for a requesting member based on the information stored in the member profile including, but not limited to, the size of the company, its industry sector, its location, its revenue and profits, the company's popularity (e.g., measured by profile views, likes, social media mentions, and so on), and any other relevant factor.

an activity analysis module 326 for tracking the activities of multiple members of the server system 120 (e.g., any member that agrees to activity tracking) and then using those stored activities to infer information about each tracked member;

a score generation module 328 for generating a matching score between one or more potential account recommendations and a first member (e.g., the member for whom the server system 120 is generating account recommendations);

a ranking module 330 for ordering or sorting the identified potential account recommendations based on the generated match score; and a recommendation selection module 332 for selecting one or more of the potential account recommendations to send to the first member for display;

server data modules 334, holding data related to server system (FIG. 1, 120), including but not limited to:

member profile data 130 including both data provided by the member person who will be prompted to provide some personal information, such as his or her name, age (e.g., birth date), gender, interests, contact information, home town, address, educational background (e.g., schools, majors, etc.), current job title, job description, industry, employment history, skills, professional organizations, memberships to other social networks, customers, past business relationships, seller preferences; inferred member information based on member activity, social graph data, and overall trend data for the social networking system 120; and so on;

member activity data 132 including data representing any interaction that the member has with the social network server system 120, including, but not limited to, log on/log off events, messages, invites, page views, profile saves, purchases, recommendation results, customer relationship data, and so on;

organization profile data 134 including data describing one or more organizations (e.g., companies, corporations, non-governmental organizations, government entities and so on); and social graph data 138 including data that represents members of the server system and the social connections between them.

FIG. 4 is a member interface diagram illustrating an example of a user interface 400 or web page that incorporates a lead recommendation service into a social networking service. In the example member interface of FIG. 4, the content module depicted represents a profile page for a member of the server system with the name John Smith. In this example, the member has specifically selected the "Account Recommendations" tab 406.

As shown in FIG. 4, the user interface 400 displays the "Account Recommendations" tab 406. On the "Account Recommendations" tab 406, the server system (e.g., system 120 in FIG. 1) displays one or more account recommendations (as buttons or links to be selected) 402-1 to 402-6. Each account recommendation lists the name of the company, its self-identified or inferred sector, and its location. In this way, a member can quickly review the recommendations and, if the member has interest in the recommended accounts, the member can select one or more of the account recommendation links to receive more information.

In some example embodiments, the user interface 400 has additional information in specific set apart sections 408, 410, and 412 in addition to a content stream or activity feed 404.

Figure 5:
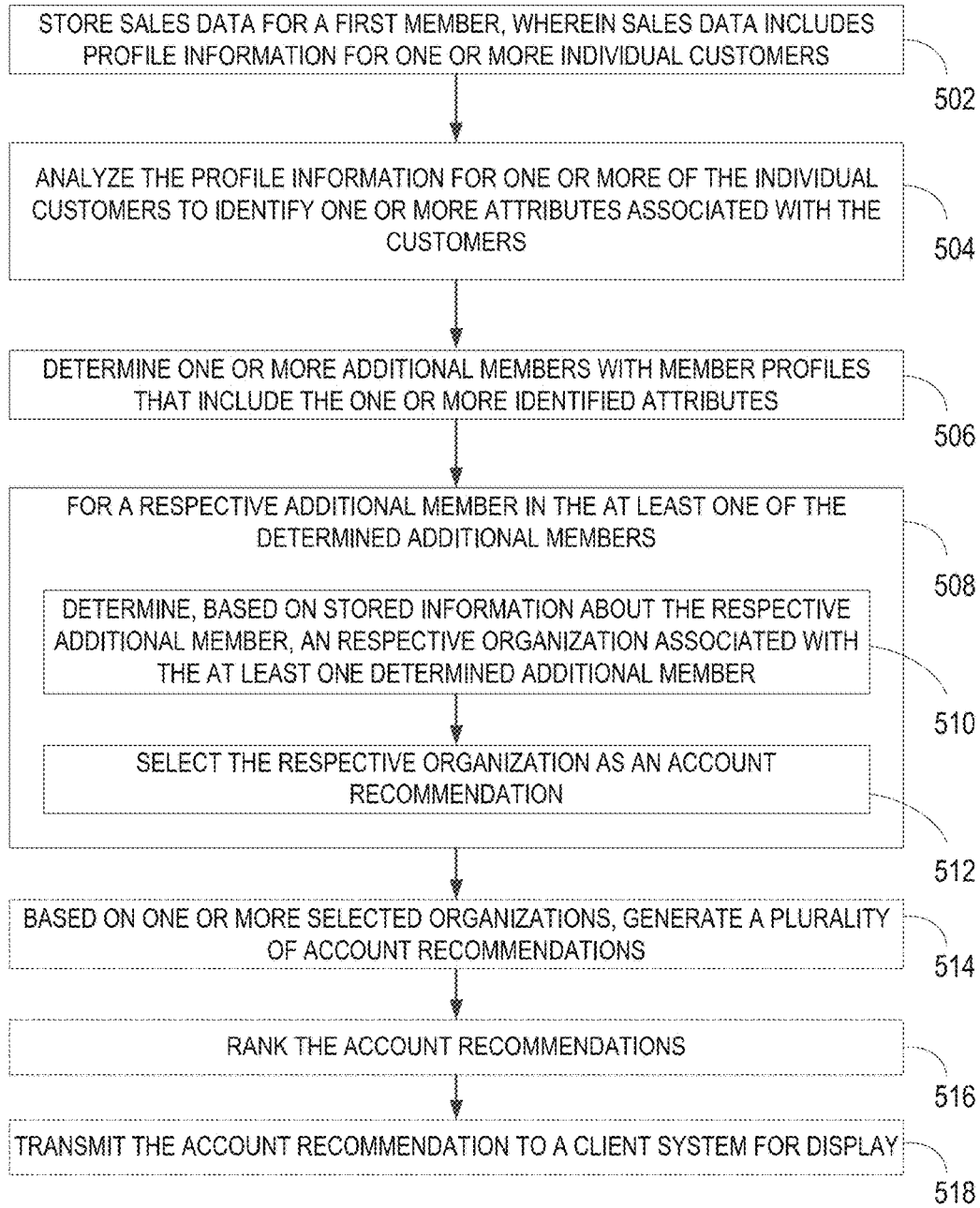
FIG. 5 is a flow diagram illustrating a process for generating account recommendations, in accordance with some embodiments.

FIG. 5 is a flow diagram illustrating a process for generating account recommendations, in accordance with some embodiments. Each of the operations shown in FIG. 5 may correspond to instructions stored in a computer memory or computer readable storage medium. Optional operations are indicated by dashed lines (e.g., boxes with dashed-line borders). In some embodiments, the method described in FIG. 5 is performed by the server system (FIG. 1, 120).

In some embodiments, the method is performed at a server system (e.g., system 120 in FIG. 1) including one or more processors and memory storing one or more programs for execution by the one or more processors. In some embodiments the server system (e.g., system 120 in FIG. 1) is associated with or hosts a social network.

The server system stores (502) data for a first member, wherein sales data includes profile information for one or more individual customers. The server system (e.g., system 120 in FIG. 1) analyzes (504) the profile information for one or more of the individual customers to identify one or more attributes associated with the customers.

The server system (e.g., system 120 in FIG. 1) then determines one or more additional members with member profiles that include the one or more identified attributes (506). For example, if one of the identified attributes is that the member has a role that is associated with human resources and has 10 years of seniority, the server system (e.g., system 120 in FIG. 1) then identifies additional members that have a role in human resources and have around 10 years of seniority.

For a respective additional member in the at least one of the determined additional members (508), the server system (e.g., system 120 in FIG. 1) determines (510), based on stored information about the respective additional member, a respective organization associated with the at least one determined additional member. In some example embodiments, an organization associated with an additional member is the employer of the additional member.

The server system (e.g., system 120 in FIG. 1) selects (512) the respective organization as an account recommendation. In some example embodiments, based on one or more selected organizations, the server system (e.g., system 120 in FIG. 1) generates (514) a plurality of account recommendations.

In some example embodiments the server system (e.g., system 120 in FIG. 1) ranks (516) the account recommendations. The account recommendations are ranked based, at least in part, on member preferences. In some example embodiments, the account recommendations are ranked based, at least in part, on social graph data. The server system (e.g., system 120 in FIG. 1) then transmits (518) the account recommendation to a client system for display.

Figure 6:
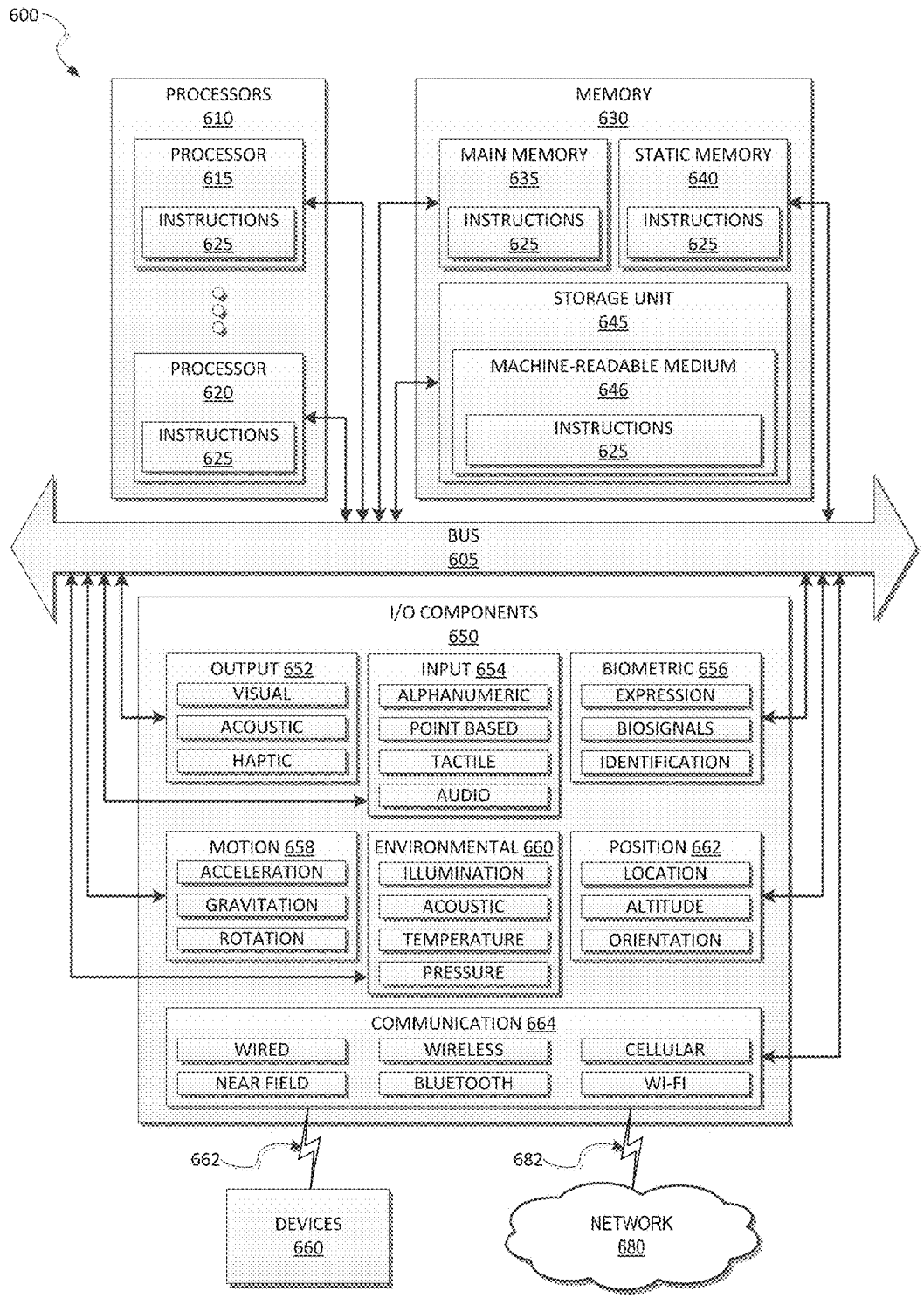
FIG. 6 is a block diagram illustrating components of a machine, according to some example embodiments.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system, within which instructions 625 (e.g., software, a program, an application, an applet, an app, or other executable code) for causing the machine 600 to perform any one or more of the methodologies discussed herein may be executed. In alternative embodiments, the machine 600 operates as a stand-alone device or may be coupled (e.g., networked) to other machines. In a networked deployment, the machine 600 may operate in the capacity of a server machine or a client machine in a server-client network environment, or as a peer machine in a peer-to-peer (or distributed) network environment. The machine 600 may comprise, but be not limited to, a server computer, a client computer, a PC, a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 625, sequentially or otherwise, that specify actions to be taken by machine 600. Further, while only a single machine 600 is illustrated, the term "machine" shall also be taken to include a collection of machines 600 that individually or jointly execute the instructions 625 to perform any one or more of the methodologies discussed herein.

The machine 600 may include processors 610, memory 630, and I/O components 650, which may be configured to communicate with each other via a bus 605. In an example embodiment, the processors 610 (e.g., a CPU, a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, processor 615 and processor 620, which may execute instructions 625. The term "processor" is intended to include multi-core processor that may comprise two or more independent processors (also referred to as "cores") that may execute instructions contemporaneously. Although FIG. 6 shows multiple processors, the machine 600 may include a single processor with a single core, a single processor with multiple cores (e.g., a multi-core process), multiple processors with a single core, multiple processors with multiples cores, or any combination thereof.

The memory 630 may include a main memory 635, a static memory 640, and a storage unit 645 accessible to the processors 610 via the bus 605. The storage unit 645 may include a machine-readable medium 646 on which is stored the instructions 625 embodying any one or more of the methodologies or functions described herein. The instructions 625 may also reside, completely or at least partially, within the main memory 635, within the static memory 640, within at least one of the processors 610 (e.g., within the processor's cache memory), or any suitable combination thereof, during execution thereof by the machine 600. Accordingly, the main memory 635, static memory 640, and the processors 610 may be considered as machine-readable media 646.

As used herein, the term "memory" refers to a machine-readable medium 646 able to store data temporarily or permanently and may be taken to include, but not be limited to, random-access memory (RAM), read-only memory (ROM), buffer memory, flash memory, and cache memory. While the machine-readable medium 646 is shown in an example embodiment to be a single medium, the term "machine-readable medium" should be taken to include a single medium or multiple media (e.g., a centralized or distributed database, or associated caches and servers) able to store instructions 625. The term "machine-readable medium" shall also be taken to include any medium, or combination of multiple media, that is capable of storing instructions (e.g., instructions 625) for execution by a machine (e.g., machine 600), such that the instructions, when executed by one or more processors of the machine 600 (e.g., processors 610), cause the machine 600 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., Erasable Programmable Read-Only Memory (EPROM)), or any suitable combination thereof. The term "machine-readable medium" specifically excludes non-statutory signals per se.

The I/O components 650 may include a wide variety of components to receive input, provide and/or produce output, transmit information, exchange information, capture measurements, and so on. It will be appreciated that the I/O components 650 may include many other components that are not shown in FIG. 6. In various example embodiments, the I/O components 650 may include output components 652 and/or input components 654. The output components 652 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 654 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, and/or other pointing instrument), tactile input components (e.g., a physical button, a touch screen that provide location and force of touches or touch gestures, and/or other tactile input components), audio input components (e.g., a microphone), and the like.

In further example embodiments, the I/O components 650 may include biometric components 656, motion components 658, environmental components 660, and/or position components 662 among a wide array of other components. For example, the biometric components 656 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, finger print identification, or electroencephalogram based identification), and the like. The motion components 658 may include acceleration sensor components (e.g., accelerometer), gravitation sensor components, rotation sensor components (e.g., gyroscope), and so forth. The environmental components 660 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), and/or other components that may provide indications, measurements, and/or signals corresponding to a surrounding physical environment. The position components 662 may include location sensor components (e.g., a Global Position System (GPS) receiver component), altitude sensor components (e.g., altimeters and/or barometers that detect air pressure from which altitude may be derived), orientation sensor components (e.g., magnetometers), and the like.

Communication may be implemented using a wide variety of technologies. The I/O components 650 may include communication components 664 operable to couple the machine 600 to a network 680 and/or devices 660 via coupling 682 and coupling 662, respectively. For example, the communication components 664 may include a network interface component or other suitable device to interface with the network 680. In further examples, communication components 664 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 660 may be another machine and/or any of a wide variety of peripheral devices (e.g., a peripheral device couple via a Universal Serial Bus (USB)).

Moreover, the communication components 664 may detect identifiers and/or include components operable to detect identifiers. For example, the communication components 664 may include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec code, Data Matrix, Dataglyph, MaxiCode, PDF416, Ultra Code, UCC RSS-2D bar code, and other optical codes), acoustic detection components (e.g., microphones to identify tagged audio signals), and so on. In additional, a variety of information may be derived via the communication components 664 such as location via Internet Protocol (IP) geo-location, location via Wi-Fi® signal triangulation, location via detecting a NFC beacon signal that may indicate a particular location, and so forth.

Transmission Medium

In various example embodiments, one or more portions of the network 680 may be an ad hoc network, an intranet, an extranet, a virtual private network (VPN), a LAN, a wireless LAN (WLAN), a WAN, a wireless WAN (WWAN), a MAN, the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 680 or a portion of the network 680 may include a wireless or cellular network, and the coupling 682 may be a Code Division Multiple Access (CDMA) connection, a Global System for Mobile communications (GSM) connection, or other type of cellular or wireless coupling. In this example, the coupling 682 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 625 may be transmitted and/or received over the network 680 using a transmission medium via a network interface device (e.g., a network interface component included in the communication components 664) and utilizing any one of a number of well-known transfer protocols (e.g., HTTP). Similarly, the instructions 625 may be transmitted and/or received using a transmission medium via the coupling 662 (e.g., a peer-to-peer coupling) to devices 660. The term "transmission medium" shall be taken to include any intangible medium that is capable of storing, encoding, or carrying instructions 625 for execution by the machine 600, and includes digital or analog communications signals or other intangible medium to facilitate communication of such software.

Furthermore, the machine-readable medium 646 is non-transitory (in other words, not having any transitory signals) in that it does not embody a propagating signal. However, labeling the machine-readable medium 646 as "non-transitory" should not be construed to mean that the medium is incapable of movement; the medium should be considered as being transportable from one physical location to another. Additionally, since the machine-readable medium 646 is tangible, the medium may be considered to be a machine-readable device.

Term Usage

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A system comprising:
a computer-readable medium having instructions stored thereon, which, when executed by a processor, cause the system to:
receiving an indication of interaction of a first member of a social networking service with a graphical user interface of the social networking service, the interaction including viewing one or more member profiles in the social networking service without having performed a search query or providing specific search criteria for the one or more member profiles;
identify one or more attributes specified by the one or more viewed member profiles;
search a database of member profiles to locate a plurality of additional member profiles sharing the one or more attributes;
obtain, from the located plurality of additional member profiles sharing the one or more attributes, one or more identifications of one or more organizations associated with a plurality of members corresponding to the additional member profiles;
calculate a match score between each of the one or more organizations and the first member, based on a set of one or more user preferences stored by the server for the first member;
rank the one or more organizations based on their corresponding match scores; and
surface one or more highest ranked organizations in a graphical user interface as a recommended account for the first member.

2. The system of claim 1, wherein an organization is associated with a member if the organization employs the member.

3. The system of claim 1, wherein at least one of the plurality of member profiles is imported from a customer relationship management (CRM) software server external to the server hosting the social networking service.

4. The system of claim 1, wherein the one or more user preferences includes geographical area.

5. The system of claim 1, wherein the one or more user preferences includes member title.

6. The system of claim 1, wherein the one or more user preferences includes member past sales information.

7. The system of claim 1, wherein the one or more user preferences includes school.

8. A method comprising:
receiving an indication of interaction of a first member of a social networking service with a graphical user interface of the social networking service, the interaction including viewing one or more member profiles in the social networking service without having performed a search query or providing specific search criteria for the one or more member profiles;
identifying one or more attributes specified by the one or more viewed member profiles;
searching a database of member profiles to locate a plurality of additional member profiles sharing the one or more attributes;

obtaining, from the located plurality of additional member profiles sharing the one or more attributes, one or more identifications of one or more organizations associated with a plurality of members corresponding to the additional member profiles;

calculating a match score between each of the one or more organizations and the first member, based on a set of one or more user preferences stored by the server for the first member;

ranking the one or more organizations based on their corresponding match scores; and surfacing one or more highest ranked organizations in a graphical user interface as a recommended account for the first member.

9. The method of claim 8, wherein an organization is associated with a member if the organization employs the member.

10. The method of claim 8, wherein at least one of the plurality of member profiles is imported from a customer relationship management (CRM) software server external to the server hosting the social networking service.

11. The method of claim 8, wherein the one or more user preferences includes geographical area.

12. The method of claim 8, wherein the one or more user preferences includes member title.

13. The method of claim 8, wherein the one or more user preferences includes member past sales information.

14. The method of claim 8, wherein the one or more user preferences includes school.

15. A non-transitory computer readable storage medium storing one or more programs for execution by one or more processors, the one or more programs comprising instructions for:

receiving an indication of interaction of a first member of a social networking service with a graphical user interface of the social networking service, the interaction including viewing one or more member profiles in the social networking service without having performed a search query or providing specific search criteria for the one or more member profiles;

identifying one or more attributes specified by the one or more viewed member profiles;

searching a database of member profiles to locate a plurality of additional member profiles sharing the one or more attributes;

obtaining, from the located plurality of additional member profiles sharing the one or more attributes, one or more identifications of one or more organizations associated with a plurality of members corresponding to the additional member profiles;

calculating a match score between each of the one or more organizations and the first member, based on a set of one or more user preferences stored by the server for the first member;

ranking the one or more organizations based on their corresponding match scores; and surfacing one or more highest ranked organizations in a graphical user interface as a recommended account for the first member.

16. The non-transitory computer readable storage medium of claim 15, wherein an organization is associated with a member if the organization employs the member.

17. The non-transitory computer readable storage medium of claim 15, wherein at least one of the plurality of member profiles is imported from a customer relationship management (CRM) software server external to the server hosting the social networking service.

18. The non-transitory computer readable storage medium of claim 15, wherein the one or more user preferences includes geographical area.

19. The non-transitory computer readable storage medium of claim 15, wherein the one or more user preferences includes member title.

20. The non-transitory computer readable storage medium of claim 15, wherein the one or more user preferences includes member past sales information.

* * * * *